United States Patent [19]

Kopetzky

[11] Patent Number: 5,310,132
[45] Date of Patent: May 10, 1994

[54] BELT RETRACTOR WITH TENSION RELIEF FOR SAFETY BELT RESTRAINING SYSTEMS IN MOTOR VEHICLES

[75] Inventor: Robert Kopetzky, Mutlangen, Fed. Rep. of Germany

[73] Assignee: TRW Repa GmbH, Alfdorf, Fed. Rep. of Germany

[21] Appl. No.: 978,790

[22] Filed: Nov. 19, 1992

[30] Foreign Application Priority Data

Nov. 21, 1991 [EP] European Pat. Off. ........ 91119837

[51] Int. Cl.⁵ ............................................. B60R 22/34
[52] U.S. Cl. ................................... 242/107; 242/107.6
[58] Field of Search ................ 242/107, 107.5, 107.6; 280/806, 807

[56] References Cited

U.S. PATENT DOCUMENTS

| | | | |
|---|---|---|---|
| 4,303,208 | 12/1981 | Tanaka | 242/107 |
| 4,382,563 | 5/1983 | Morita et al. | 242/107 |
| 4,383,658 | 5/1983 | Morita et al. | 242/107 |
| 4,471,918 | 9/1984 | Ando | 280/806 X |
| 4,568,037 | 2/1986 | Kawaguchi et al. | 280/806 X |
| 4,579,294 | 4/1986 | Sakakibara et al. | 280/806 X |
| 4,809,925 | 3/1989 | Takada | 242/107 |
| 4,913,372 | 4/1990 | Takada | 242/107 |
| 4,989,804 | 2/1991 | Ebner et al. | 242/107 |
| 4,993,657 | 2/1991 | Brown | 242/107 |
| 5,072,968 | 12/1991 | Hamaue | 280/806 |
| 5,080,298 | 11/1992 | Sasaki et al. | 242/107 |
| 5,087,075 | 2/1992 | Hamaue | 242/107 X |
| 5,165,621 | 11/1992 | Mizuno et al. | 242/107 |

FOREIGN PATENT DOCUMENTS 0315900 5/1989 European Pat. Off. .
8906305 9/1989 Fed. Rep. of Germany .
2217180 10/1989 United Kingdom .

Primary Examiner—Daniel P. Stodola
Assistant Examiner—John P. Darling
Attorney, Agent, or Firm—Tarolli, Sundheim & Covell

[57] ABSTRACT

A belt retractor with tension relief for safety belt restraining systems includes a retracting spring (6) and an auxiliary spring (8) dimensioned more weakly than the latter. The retracting spring (6) acts between a housing (10) of the belt retractor and a spring receiver (12). The auxiliary spring (8) acts between the spring receiver (12) and the belt spool (2). By blocking a ratchet wheel (48) which is rotatable to a limited extent relatively to the spring receiver (12) a change can be made between a normal operation in which only the retracting spring (6) defines the automatic belt retraction force, and a comfort operation in which only the auxiliary spring (8) is effective. Between the spring receiver (12) and the belt spool (2) a friction brake (22, 24) is operative to dampen a tensioning operation of the auxiliary spring (8) by the retracting spring (6) on changing from comfort to normal operation. The brake (22, 24) can be selectively activated by sensing the relative rotation between the spring receiver (12) and the ratchet wheel (48) so that it is inactive in the comfort operation of the belt retractor.

7 Claims, 3 Drawing Sheets

BELT RETRACTOR WITH TENSION RELIEF FOR SAFETY BELT RESTRAINING SYSTEMS IN MOTOR VEHICLES

The invention relates to a belt retractor with tension relief for safety belt restraining systems in vehicles, comprising a retracting spring which is effective between a housing-fixed member and the belt spool receiving the webbing and the first end of which engages the housing-fixed member, a rotatably mounted ratchet wheel which is inserted into the force flow between retracting spring and belt spool and to which the second end of the retracting spring is drivingly connected, a spiral auxiliary spring which is weaker than the retracting spring and which in turn is effective between the ratchet wheel and the belt spool, the ratchet wheel cooperating with a pawl which in dependence upon a control criterion blocks or releases the rotational movement of the ratchet wheel, and a brake means for damping the tensioning operation of the auxiliary spring by the retracting spring.

A belt retractor of this type is known from U.S. Pat. No. 4,989,804. When the ratchet wheel of this retractor is locked the pressure excerted on the vehicle occupant by the fastened belt is low because it is governed solely by the auxiliary spring which is weaker than the retracting spring. As soon as this socalled comfort condition is disabled by release of the ratchet wheel, the stronger retracting spring pulls the turns of the auxiliary spring into engagement with each other and alone acts on the belt spool to completely and reliably take up the webbing.

The brake means prevent the turns of the auxiliary spring abruptly striking each other with resulting impact stress and noise development after release of the ratchet wheel. When the auxiliary spring is pulled tight, i.e. completely tensioned, the brake means is inactive in order to avoid impairing the normal function of the belt retractor. The activation or deactivation of the brake means takes place in dependence upon the tension state of the auxiliary spring, which is sensed at its outer periphery.

Due to the damping of the auxiliary spring the movement of the webbing in the comfort condition is subject to friction. This friction impairs the desired wearing comfort in so far as the force for overcoming this friction during belt withdrawal must be overcome in addition to the force required to tension the auxiliary spring. On the other hand, the tension of the auxiliary spring on belt retraction in the comfort position is reduced by the frictional force so that to avoid impairing the reliable retraction function of the belt retractor in the comfort position there are limits to a reduction of the forces acting.

The invention provides an improved comfort retractor wherein the coiling and uncoiling of the webbing in the comfort condition of the belt retractor occurs without friction, and the tension exerted on the vehicle occupant can be further reduced, the advantage of a gentle and smooth change between reduced and unreduced belt tension being retained.

In the belt retractor of the present invention, the second end of the retracting spring engages a spring receiver which is limitedly rotatable relatively to the ratchet wheel and is coupled to the latter via a pretensioned spring acting in the peripheral direction; the brake means is activatable by sensing of the relative rotation between the spring receiver and ratchet wheel; and the brake means is a friction brake which is selectively activatable between the spring receiver and a member connected to the belt spool and in the activated state dampens by friction the relative rotation between the belt spool and spring receiver.

The brake means of this belt retractor is activated only when the ratchet wheel is freely rotatable, i.e. outside the comfort condition. In the comfort condition with the ratchet wheel locked the spring receiver turns through a small angle of rotation with respect to the ratchet wheel, the brake means thereby being deactivated. On return to normal operation the auxiliary spring is gently tensioned against the friction force of the brake means. Since the brake means only dampens the function of the auxiliary spring, the further operation of the belt retractor is not impaired.

In a preferred embodiment a coupling pawl is pivotally mounted on the spring receiver; the coupling pawl comprises an actuating arm on which a driver connected to the ratchet wheel engages. The coupling pawl cooperates with an externally toothed coupling wheel to which a friction element in frictional engagement with the member connected to the belt spool is non-rotatably connected. This embodiment is distinguished by particular constructional simplicity of the brake means and the actuation thereof.

It is easy to accommodate in the constructional space available and requires only a few individual parts.

In the preferred embodiment, in a range between completely and partially tensioned auxiliary spring the biasing force of the retracting spring does not exceed the sum of the biasing force of the auxiliary spring and the frictional force of the friction brake so that the auxiliary spring is never completely tensioned. On changing to the comfort position the reduced retracting force is immediately available; it is not necessary to withdraw first a considerable webbing length from the retractor in order to partially relax a completely tensioned auxiliary spring and thus shift the range of action of the auxiliary spring in the withdrawal direction. Moreover, with this step the range of action of the comfort function is extended to a greater rotational angular range of the belt spool.

Further features and advantages of the invention will be apparent from the following description of an advantageous embodiment with reference to the drawings, wherein:

FIG. 1 serves generally to explain the function principle of belt retractors with tension relief;

FIGS. 2 and 3 serve to explain the function principle of the embodiment of the belt retractor described;

Figure 1:
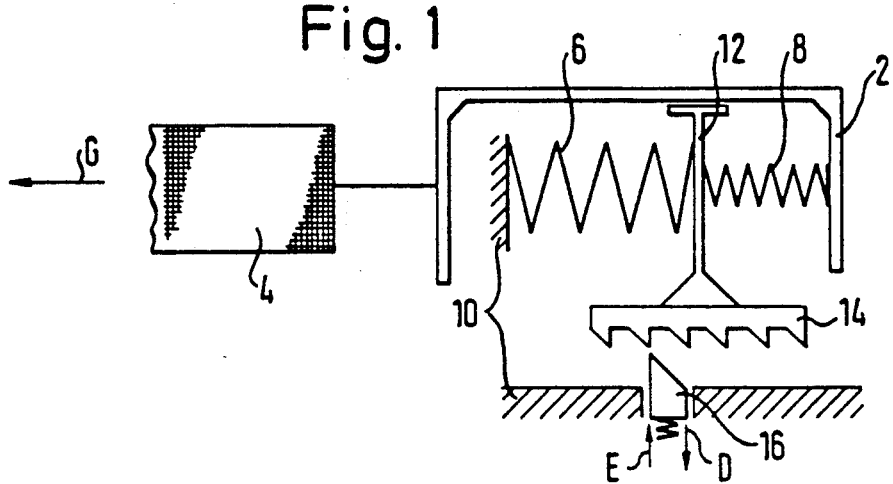

The webbing 4 is coiled on a belt spool 2 of the belt retractor with tension relief. On withdrawing webbing 4 the belt spool 2 is rotated against the action of two spiral springs 6 and 8 connected in series. One of the spiral springs is a retracting spring 6 of relatively high spring force which ensures the automatic winding and unwinding of the webbing 4. The other spiral spring is a more weakly dimensioned auxiliary spring 8 which holds the webbing 4 under slight tension in comfort operation. In normal operation the auxiliary spring 8 is biased because its turns are completely compacted by the stronger retracting spring 6.

Figure 2:
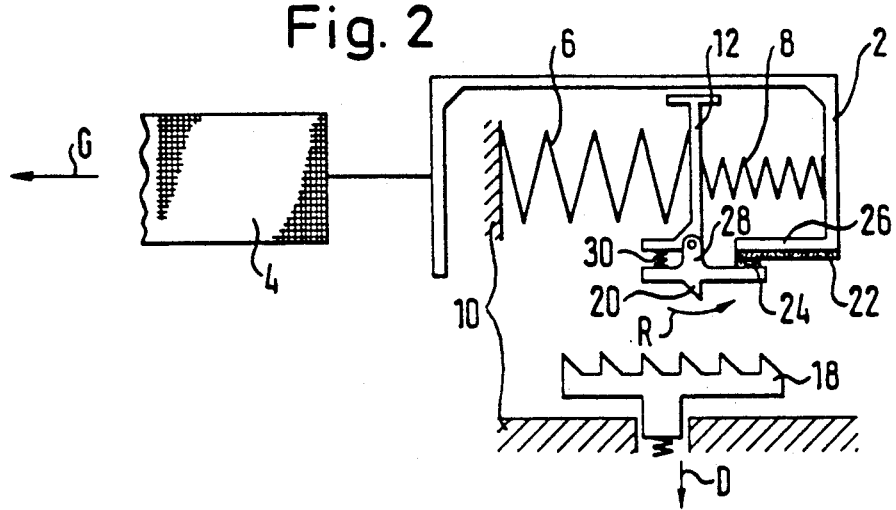
Figure 3:
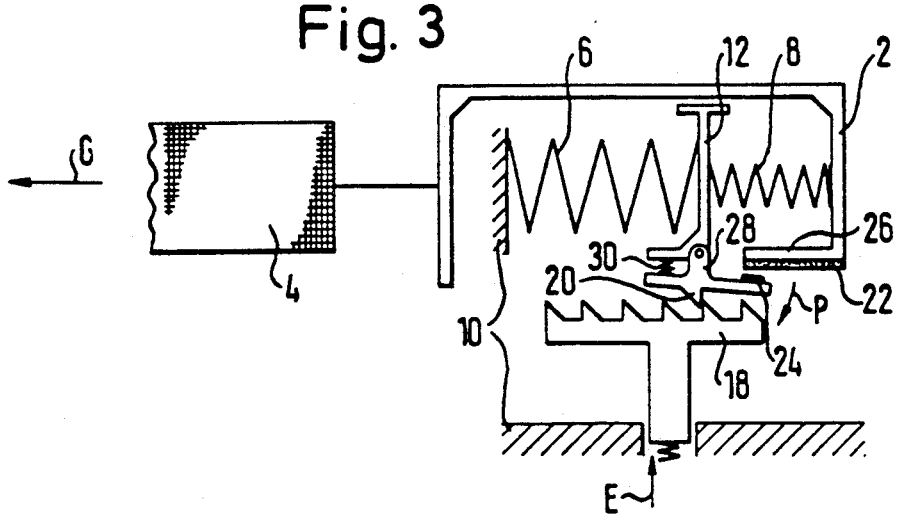

To illustrate clearly the basic structure and function of the belt retractor the essential parts thereof in FIGS. 1 to 3 are drawn as if they were linearly movable. The webbing 4 is coupled to the belt spool 2. The belt spool 2 is movable with respect to a schematically indicated housing 10. One end of the retracting spring 6 is secured to the housing 10 and the other end thereof is connected to a movable spring receiver 12. One end of the auxiliary spring 8 is connected to the spring receiver 12 and the other end thereof engages the belt spool 2. The spring receiver 12 comprises in FIG. 1 ratchet teeth 14. A blocking pawl 16 is connected to a changeover means which is not illustrated and by means of which said pawl is displaceable along the arrows D and E between a position engaging the ratchet teeth 14 and a position disengaged from the ratchet teeth 14. The changeover means for example holds the blocking pawl 16 engaged when the buckle of the safety belt system is closed.

When the blocking pawl 16 is disengaged from the ratchet teeth 14 the retracting spring 6 holds the weaker auxiliary spring 8 and the spring receiver 12 in a position in which the turns of the auxiliary spring 8 bear on each other The webbing 4 is automatically biased against the webbing withdrawal direction G solely by the action of the retracting spring 6, this corresponding to normal operation of the belt retractor. When the blocking pawl 16 is engaged in the ratchet teeth 14 the spring receiver 12 is held fixed with respect to the housing so that the retracting spring 6 is blocked and only the weaker auxiliary spring 8 subjects the webbing 4 to a tension, which is now reduced. To extend the comfort function in the webbing withdrawal direction however the vehicle occupant must first withdraw a length of webbing 4 in order for the completely tensioned auxiliary spring 8 to be partially relaxed During this operation the resiliently engaged blocking pawl 16 yields so that on webbing withdrawal the spring receiver 12 is turned in the withdrawal direction As soon as the ratchet teeth 14 are released again, the stronger retracting spring 6 becomes effective and moves the spring receiver 12 until the turns of the auxiliary spring 8 come against each other. These turns would strike against each other abruptly with shock and noise development if the tension of the auxiliary spring 8 were not dampened by a brake means.

In the belt retractor according to the invention shown in FIGS. 2 and 3 a blocking pawl 20 pivotally mounted on the spring receiver 12 cooperates with ratchet teeth 18.

A brake means is formed by a friction clutch having two cooperating frictional faces 22 and 24, one frictional face 22 of which is connected to the belt spool 2 and the other frictional face 24 of which is connected to the spring receiver 12. In the state shown in FIG. 2 the ratchet teeth 18 are moved away from the blocking pawl 20 in the direction D and the friction clutch has no effect at all on the normal operation of the belt retractor. For as soon as the blocking pawl 20 is free the auxiliary spring 8 is tensioned by the retracting spring 6, the frictional faces 22 and 24 sliding frictionally on each other and damping the tensioning of the auxiliary spring 8. Thereafter the belt spool 2 is subjected solely and in undamped manner to the action of the retracting spring 6.

The blocking pawl 20 is formed on a rocker lever 28 which is mounted pivotally on the spring receiver 12 and is provided with the frictional face 24. The rocker lever 28 is biased by a pressure spring 30 supported on the spring receiver 12 in a direction R (FIG. 2) to establish a frictional connection between the frictional faces 22 and 24. When the ratchet teeth 18 are engaged in the direction E and the blocking pawl 20 is blocked (FIG. 3), i.e. the comfort function is active, the spring force of the retracting spring 6 acts on the rocker lever 28. The spring force of the pressure spring 30 and the lever ratios of the rocker lever 28 are chosen so that the rocker lever 28 is then held pivoted in a direction P and the frictional face 24 is lifted off the frictional face 22. In this position, in which only the auxiliary spring 8 but not the retracting spring 6 acts on the belt spool 2, the frictional connection between the belt spool 2 and the spring receiver 12 is interrupted and the belt spool 2 is movable elastically and undamped as in the normal operation described above. No friction is present which could affect the retraction behaviour of the auxiliary spring 8. Consequently, the auxiliary spring 8 may be weakly dimensioned in order to keep the retraction forces low and thus increase the wearing comfort.

In the belt retractor according to FIGS. 2 and 3 the retracting spring 6, the auxiliary spring 8 and the friction force between the frictional faces 22 and 24 are so matched that the auxiliary spring 8 is never completely tensioned in normal operation in accordance with FIG. 2. After engagement of the blocking pawl 20 according to FIG. 3 the range of action of the auxiliary spring 8 therefore also extends in the withdrawal direction of the webbing so that the comfort range in the withdrawal direction is increased. On belt withdrawal beyond the action range of the auxiliary spring 8 the transition between the action of the auxiliary spring 8 and the retracting spring 6 takes place smoothly without shock. The comfort range is not only expediently shifted but is also effectively greater than with a conventional belt retractor.

Figure 4:
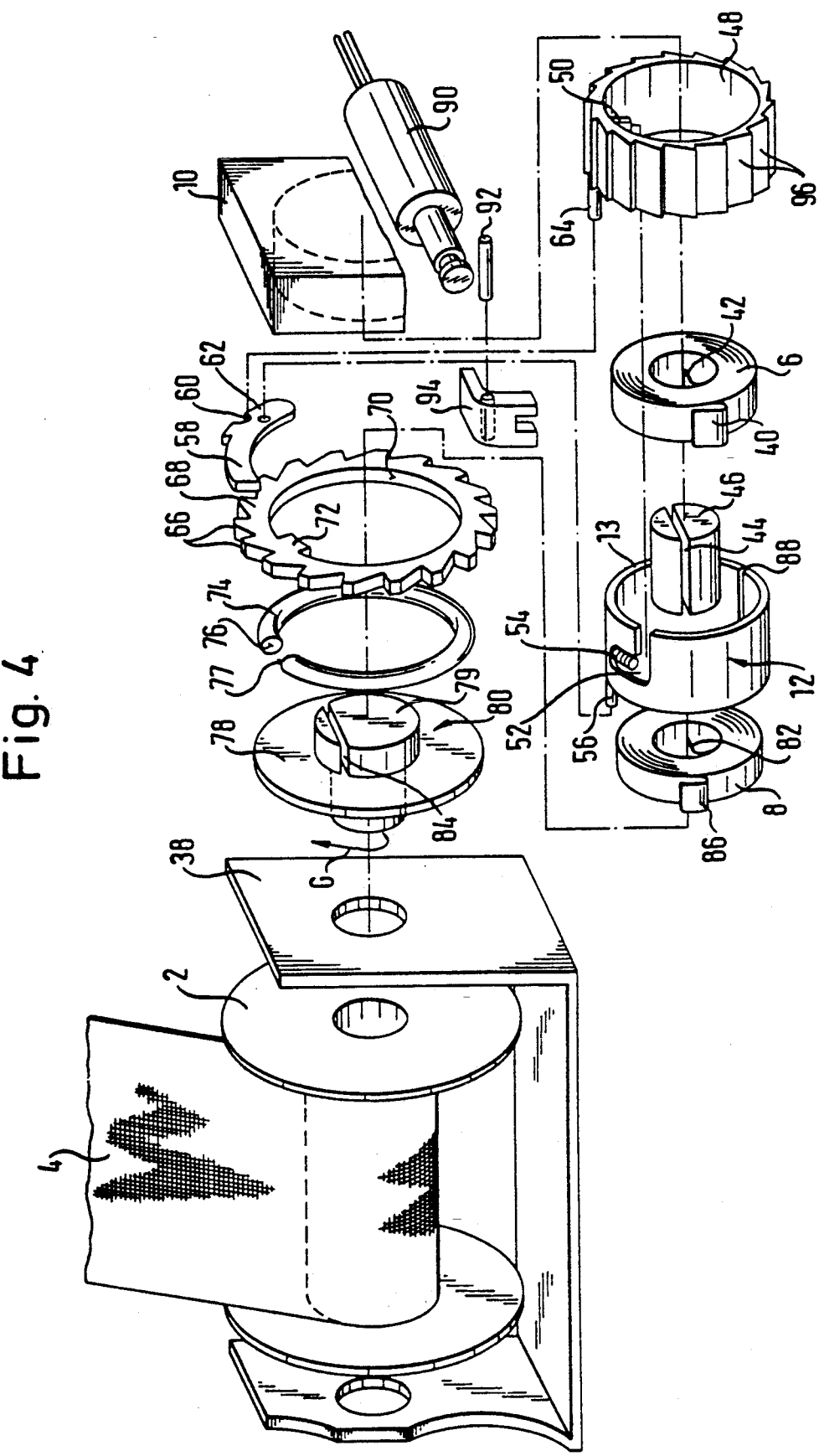
FIG. 4 is an exploded illustration of an embodiment of the belt retractor.
Figure 6:
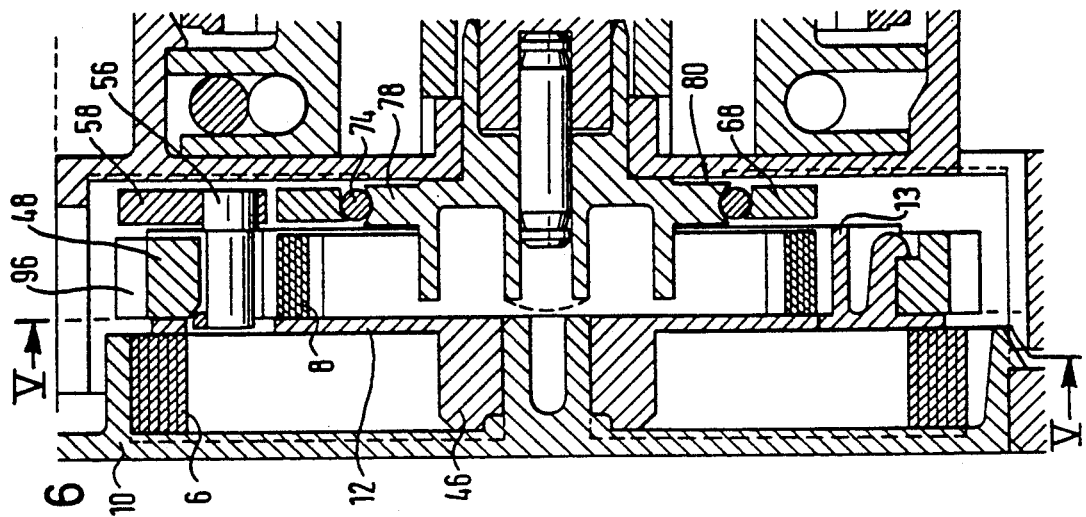
FIG. 6 is a partial section of said belt retractor along the line VI—VI of FIG. 5.
Figure 5:
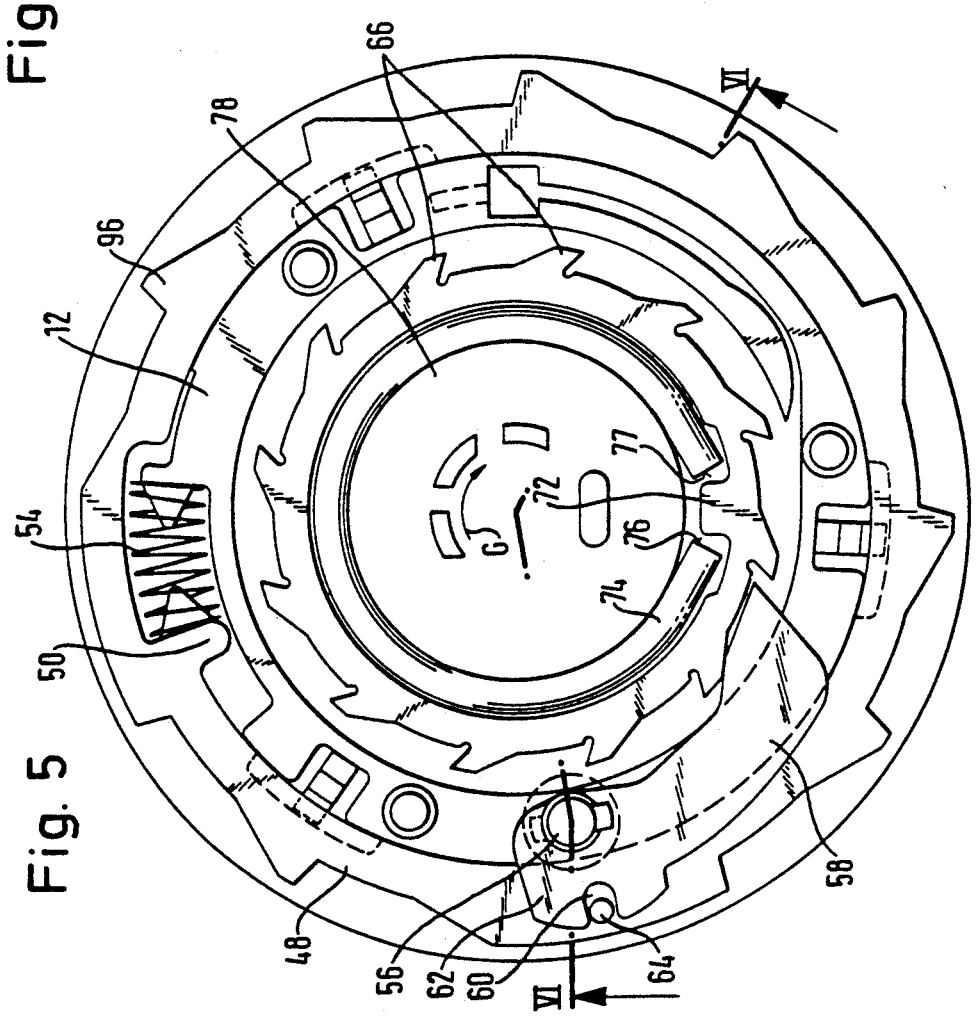
FIG. 5 is a lateral view, taken generally along line V—V of FIG. 6, of the brake means of an assembled belt retractor according to FIG. 4.

Hereinafter a particularly expedient embodiment will be described with the aid of FIGS. 4 to 6. In so far as the elements of this embodiment correspond to elements of FIGS. 1 to 3, the same reference numerals will be used.

The webbing 4 is partially coiled on the belt spool 2. The belt spool 2 is rotatably mounted in a frame 38. A cover 10 is laterally secured to the frame 38. In the cover 10 there is a spiral retracting spring 6 of resilient strip material. An outer bent end 40 of the retracting spring 6 is secured to the cover 10. An inner bent end 42 is received in a driver slot 44 in an axially laterally projecting stud 46 of a pot-like spring receiver 12. A cylindrical ratchet wheel 48 toothed at the outer periphery is rotatably mounted at the outer periphery of the spring receiver 12. An inwardly projecting stud 50 on the ratchet wheel 48 projects into an elongated recess 52 extending in the peripheral direction on the spring receiver 12, which is laterally open to permit assembly. A pressure spring 54 extends longitudinally in the recess 52 and is supported between one end of the recess 52 and the stud 50. A coupling pawl 58 is pivotally mounted on a stud 56 projecting in the axial direction at the periphery of the spring receiver 12. A stud-like driver 64 projecting axially and outwardly offset radially with respect to the stud 56 engages into a slot 60 of a radial actuating arm 62 of the coupling pawl 58. When the spring 54 is extended the coupling pawl 58 engages between two teeth 66 of an externally toothed coupling wheel 68. The coupling wheel 68 comprises a substantially cylindrical inner face 70 from which a projection 72 projects radially inwardly An annularly bent friction element 74 having two oppositely disposed end faces 76, 77 extends in the interior of the coupling wheel 68 along the inner face 70 thereof The projection 72 of the coupling wheel 68 projects into the gap between the end faces 76, 77 for a non-rotatable coupling to the friction element 74. The friction element 74 is placed with pretensioning on a disc-like portion 78 of a member 80 and is in frictional engagement with the latter. The member 80 is non-rotatably axially connected to the belt spool 2 and is provided with a cylindrical hub 79. An auxiliary spring 8 shaped similarly to the retracting spring 6 but of weaker dimensions surrounds the cylindrical hub 79 of the member 80 and comprises an inner bent end 82 which is fixed in a slot 84 of the hub 79. The auxiliary spring 8 is further arranged within the spring receiver 12 and in the relaxed state bears on the inner side of a cylindrical wall section 13 which is formed on the outer periphery of a radial disc-like body of the spring receiver 12 on the side thereof facing the belt spool 2. An outer angled end 86 of the auxiliary spring 8 is fixed in a slot 88 of the spring receiver 12. A switchover means 90, for example an electromagnet activated by an electrical signal from the belt buckle of the restraining system, is in operative connection with a pawl 94 mounted on a pin 92 fixed with respect to the housing. The pawl 94 can be driven into the outer teeth 96 of the ratchet wheel 48 by the switchover means 90.

In normal operation of the belt retractor the pawl 94 is out of engagement with the ratchet wheel 48. The relatively strong retracting spring 6 contracts the relatively weak auxiliary spring 8 via the spring receiver 12 freely rotatable together with the ratchet wheel 48 and a quasi-rigid connection is established between the belt spool 2 and retracting spring 6. Since no external force acts on the ratchet wheel 48, the spring 54 presses the coupling pawl 58 into the coupling wheel 68. The brake means comprising the coupling wheel 68, friction element 76 and the outer periphery of the disc 78 of the member 80 connected to the belt spool is effective to dampen a relative rotation between the belt spool 2 and the spring receiver 12. A relative rotation does not however take place when the auxiliary spring 8 is already tensioned.

Upon rotation in the belt withdrawal direction G the bevelled teeth 96 of the ratchet wheel 48 can slide on the pawl 94 and as a result the comfort region is shifted in the belt withdrawal direction. In comfort operation, the ratchet wheel 48 is blocked with respect to the housing 2 against rotation in the direction opposite the belt withdrawal direction G by the pawl 94. In the comfort position the retracting spring 6 no longer has any influence on the belt spool 2 because it is supported on both sides fixed with respect to the housing. The auxiliary spring 8 alone takes on the withdrawal of the webbing 4. A relative rotation now takes place between the belt spool 2 and spring receiver 12. The friction clutch, which would interfere in this case, is disengaged because the retracting spring 6 compresses the pressure spring 54 and turns the spring receiver 12 and the ratchet wheel 48 relatively to each other to a limited extent. The coupling pawl 58 mounted on the spring receiver 12 and in engagement with the stud 64 of the ratchet wheel 48 lifts off the teeth 66 of the coupling wheel 68 on said rotation. The coupling wheel 68 can rotate freely with the friction element 74, the member 80 and the belt spool 2, since it is uncoupled from the spring receiver 12.

After switching to normal operation the ratchet wheel 48 becomes free again and the pressure spring 54 brings the coupling pawl 58 into engagement with the coupling wheel 68 so that a braking action exists between the spring receiver 12 and the belt spool 2. Due to the friction applied, the auxiliary spring 8 is tensioned gently and without shocks by the retracting spring 6, whereupon the normal operation described above is again established.

What is claimed is:

1. A safety belt retractor for vehicles comprising:
  a housing;
  a belt spool rotatably mounted in said housing for coiling and uncoiling of belt webbing;
  a hub member connected to said belt spool for joint rotation, said member having a hub;
  an intermediate member rotatably mounted in said housing in coaxial relationship with said belt spool;
  a retracting spring having a first end connected to said housing and a second end connected to said intermediate member;
  an auxiliary spring having a first end connected to said hub and a second end connected to said intermediate member, said auxiliary spring being weaker than said retracting spring;
  a ratchet member mounted for limited rotation with respect to said intermediate member and selectively lockable in rotation with respect to said housing;
  a biasing spring engaged between said intermediate member and said ratchet member to oppose relative rotation between said intermediate member and said ratchet member;
  a braking means frictionally engaged with said hub member and mounted for rotation with respect to said hub member against frictional forces;
  a coupling member for selectively coupling said intermediate member with said braking means for joint rotation therewith; and
  said coupling member being controlled by relative rotation of said ratchet member with respect to said intermediate member.

2. The retractor of claim 1, wherein said coupling member is a pawl pivotally mounted on said intermediate member and said braking means has an externally toothed rim portion for cooperation with said pawl.

3. The retractor of claim 2, wherein said pawl has an actuating arm and said ratchet member carries a drive member engaging said actuating arm to convert relative rotation between said ratchet member and said intermediate member into pivotal movement of said pawl.

4. The retractor of claim 1, wherein said retracting spring develops a tension force which does not exceed the sum of frictional force developed by said braking means and of tension force developed by said auxiliary spring in a condition between a fully tensioned state and a partially tensioned state of said auxiliary spring.

5. The retractor of claim 1, wherein said intermediate member carries said auxiliary spring and has a peripheral wall surrounding said auxiliary spring, said ratchet member being ring-shaped and rotatably mounted on said peripheral wall.

6. The retractor of claim 1, wherein said hub member includes a disc portion, said brake means including an annular friction member frictionally engaging said disc member, said annular friction member being coupled to said externally toothed rim portion for joint rotation with respect to said disc member.

7. The retractor of claim 6, wherein said annular friction member is a split ring of spring wire, said ring having opposed ends forming a gap therebetween and said externally toothed rim portion having a radial projection engaging in said gap.

* * * * *